United States Patent Office 3,281,685
Patented Oct. 25, 1966

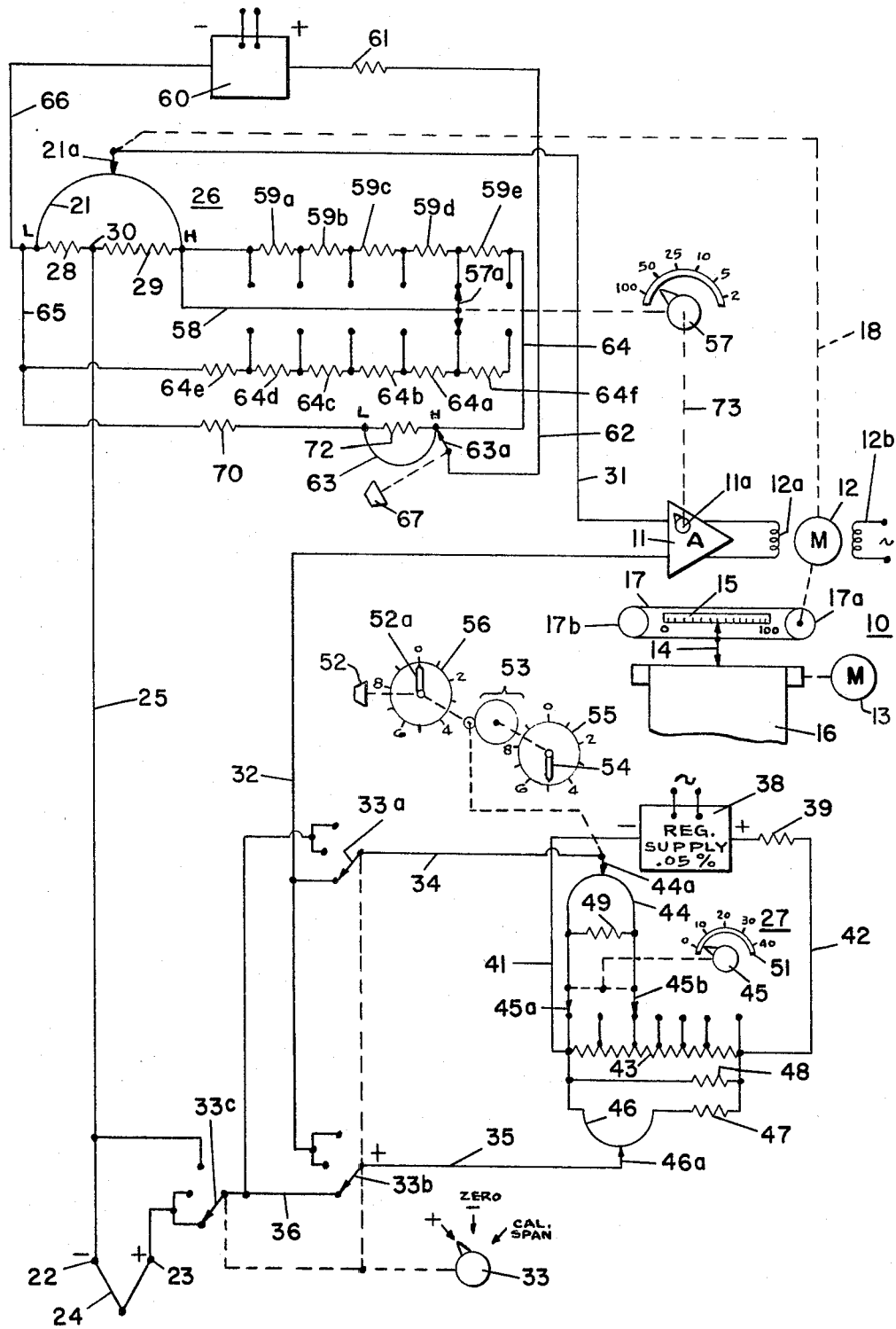

3,281,685
POTENTIOMETER BALANCE MEASURING SYSTEM INCLUDING A SINGLE SOURCE FOR CONTINUOUS ADJUSTMENT OF RANGE AND ZERO SET
Gilman S. Talbot, Jr., Philadelphia, Pa., assignor to Leeds and Northrup Company, Philadelphia, Pa., a corporation of Pennsylvania
Continuation of application Ser. No. 179,353, Mar. 13, 1962. This application Dec. 14, 1965, Ser. No. 517,884
5 Claims. (Cl. 324—99)

This application is a continuation of my application Serial No. 179,353, filed March 13, 1962, now abandoned, for a Measuring System.

This invention relates to measuring systems of the type in which there are provided arrangements for adjusting both the zero and the span and has for an object the provision of zero adjusting means by means of which there is predetermined the setting of a continuously adjustable span-determining circuit.

Measuring systems suited to the measurement of unknown conditions which may vary over a wide range and at other times over a narrow range require provisions for the adjustment of the measuring range or span of the instrument. Where the measurement requires high precision and maximum sensitivity, as for example, in conjunction with a control system where temperature is to be maintained within a fraction of a degree within the range of say between 1200° F. and 1250° F., zero suppression will also be required. Accordingly, the precision with which the range is established and the precision with which the zero of the instrument is suppressed or elevated imposes the requirement that these adjustments be made with the same precision as obtainable with the system as a whole.

It has heretofore been proposed to utilize a standard cell or other precision source of voltage for the calibration of the measuring circuit and then to utilize the calibrated measuring circuit for the adjustment of the zero suppression circuit to bring it into calibration.

In accordance with the present invention, there is utilized zero adjusting means for the measuring system of the high precision type for determining the setting of a continuously variable range or span-adjusting circuit for the measuring system. More particularly, a constant-voltage supply in conjunction with a voltage-dividing network is utilized through suitable switching devices to insert into the measuring circuit a voltage corresponding with a selected range of response of the measuring system. This voltage is introduced into the measuring circuit in opposition to a voltage developed by a range or span-determining network associated with an adjustable circuit element normally referred to as the measuring slidewire. By adjusting the voltage introduced by the range-determining network to equal that introduced by the zero adjusting network, the range-response of the system is established. Thereafter, the zero determining network is adjusted for introduction into the measuring network of a voltage of the required polarity and magnitude to predetermine zero suppression or zero elevation to meet the requirements of the measuring problem.

By reason of the use of a constant-voltage supply having a high degree of regulation, there is achieved in conjunction with the zero adjusting circuit voltage outputs having a high degree of precision, i.e., of the order of plus or minus 0.05%, and hence there is concurrently achieved the calibration of the measuring circuit and the establishment of the proper operation of the measuring system with an insertion voltage equal in magnitude to the algebraic difference between values selected for production, respectively, of the operation of an indicating means to its lowest and to its highest values on its associated scale, or in the alternative, to produce outputs corresponding with said selected low value and said selected high value.

For further objects and advantages of the invention and for a detailed description of a preferred embodiment thereof, reference is to be had to the following detailed description taken in conjunction with the accompanying drawing in which there has been diagrammatically illustrated a system embodying the invention.

Referring to the drawing, the invention in one form has been shown as applied to a measuring system 10 of the electronic type including an amplifier 11 having an output circuit connected to the control winding 12a of a motor 12 which has a power winding 12b connected to an A.C. source of supply. The motor 12 drives a pen-index 14 relative to a scale 15 and to a chart 16 driven at constant speed by a motor 13 as by a belt or violin string 17 carried by a driving pulley 17a and an idler pulley 17b. The balancing motor 12 through a mechanical connection 18 also relatively adjusts the position of a slidewire 21 and its movable contact 21a, the latter for convenience being illustrated as the adjustable element.

Those skilled in the art understand that if an unknown voltage be applied to input terminals 22 and 23, which terminals are included in the input circuit to the amplifier 11 in series with a balancing voltage developed from the measuring slidewire 21, the motor 12 will be energized to produce a null balance of the measuring system and with the pen-index 14 indicating on scale 15 and recording on the chart 16 the magnitude of the unknown voltage. For convenience, a thermocouple 24 has been illustrated connected to input terminals 22 and 23. Accordingly, temperature will be the condition or the measured variable to which the system will respond.

The terms "measured variable" and "magnitude of a condition" are intended to refer generically to process variables, such as temperature, pressure, composition and characteristics, and including mechanical displacements of detecting devices.

If the thermocouple 24 be subjected to a temperature of say 1300° F., it can be assumed that its output will be 39 millivolts. That output voltage will be applied to the input circuit of the amplifier 11 by way of a conductor 25 leading to a "live zero" point 30 at the juncture between a low-valued resistor 28 and a high-valued resistor 29 connected in series with each other and both shunting the measuring slidewire 21. A "live zero" means that the zero output position of contact 21a of slidewire 21 is slightly above its point of connection to the lefthand end of resistor 28 so that for zero output, the drop across a small section of the slidewire is equal and opposite to that developed across a low-valued resistor 28.

Continuing with the tracing of the input circuit, it extends from connection 30 through low-valued resistor 28, through the left-hand portion of slidewire 21, contact 21a, and by conductor 31 to one of the input terminals of amplifier 11. From the other input terminal, the circuit extends by way of conductor 32 to a contact 33a of a gang switch having additional switch contacts 33b and 33c. From contact 33a the input circuit extends by conductor 34 through the zero adjusting network 27 and by way of a conductor 35 to switch contact 33b. The circuit is completed by way of conductor 36 and switch contact 33c to the other side of the thermocouple 24. With the zero adjusting network 27 developing zero output between conductors 34 and 35 and with a range adjusting network 26 set for a range of zero to 39 millivolts, the amplifier 11 will be effective to energize the motor 12 to move the slidewire 21a to the right, the clockwise direction, to its maximum position, the motor at the same time rotating driving pulley 17a to move the pen index 14 to the upper end of the scale marked 100.

Pursuant to the present invention, the range or span determining network 26 is adjusted to any desired range or span by means of the zero adjusting network 27 and for reasons which will now be developed. The zero adjusting network 27 is powered by a closely regulated constant voltage source 38 energized from conventional alternating current supply lines and preferably of the semi-conductive type available on the market as part No. 099012 of Leeds & Northrup Company and described in its Data Sheet #NY2(2) 1160. By utilizing a constant-voltage circuit of conventional selected character the output voltage from the regulating supply 38 can and should be maintained at the same value plus or minus five one-hundredths of a percent. Thus, the outputs from the adjustable voltage-dividing means of network 27 is accurate with a high degree of precision corresponding to the precision of regulation of said voltage supply. Accordingly, the use of this voltage, as will now be described, achieves the concurrent calibration and setting of the measuring circuit for any desired span and provides for a precision voltage for zero suppression or elevation as may be desired. Thus, that voltage applied through a dropping resistor 39 maintains essentially constant the voltage on supply conductors 41 and 42. This voltage is applied to a potential divider of the Kelvin-Varley type formed by a tapped resistor 43 with the sections or coils between each tap having equal resistance values. This divides the voltage into a plurality of fractional values. As shown, a slidewire resistor 44, preferably of the type available on the market under the trade name Heli-Pot is utilized, and it will be provided with a range of ten turns. That slidewire is connected by switch contacts 45a and 45b to the first and third taps of resistor 43. With the adjustable contact 44a of the Heli-Pot resistor 44 in its zero position, there will be developed zero output from the Kelvin-Varley potential divider. A live zero will be preferred. Accordingly, an additional slidewire 46 is connected to conductors 41 and 42 by way of a resistor 47 and a further resistor 48 is connected in shunt therewith. An adjustable contact 46a of slidewire 46 is moved to a position which will establish the live zero position of the multiturn slidewide 44 a short distance from the mechanical limit of its movement which electrically will be in the counterclockwise direction, as viewed in the drawing. A calibrating resistor 49 is connected in shunt with multiturn slidewire 44. Its value is preferably selected so that for each revolution of contact 44a there will be developed between conductors 34 and 35 an additional millivolt. Thus, it will be seen that with contacts 45a and 45b in their illustrated "zero" position, as shown by the switch operating knob 45, any potential value from zero to ten millivolts can be obtained.

With the values of each section of the resistor 43 suitably selected, the voltage developed between conductors 34 and 35 can be increased in steps of ten millivolts each and as indicated by the scale 51 associated with knob 45. Thus, to insert in the measuring circuit the previously assumed value of 39 millivolts, the knob 45 will be operated until its pointer coincides with the scale marking of 30, at which time the contacts 45a and 45b will be respectively connected to the fourth and sixth stationary contacts. By means of a knob 52, the contact 44a will be rotated through nine revolutions. For convenience, the knob 52 operates through reduction gearing 53, a pointer 54 relative to a scale 55 to indicate the number of revolutions from the zero position. A pointer 52a associated with knob 52 cooperates with an innerscale 56 to indicate fractions of a revolution. Thus, with the foregoing adjustment completed, pointer 54 will be opposite the marking of nine on the scale indicator and pointer 52a will again be at zero. There will now be developed between conductors 34 and 35 an output voltage of 39 millivolts.

The knob 33 will now be rotated until its pointer is opposite "Cal. Span" position, meaning the calibrating position of this switch to determine the span or range to be established by the network 26. The contacts 33a–33c will now be in their respective uppermost positions. Contact 33c disconnects the thermocouple 24 from the input circuit and in conjunction with contact 33a, includes in the input circuit between conductors 25 and 32 the 39 millivolts from the zero adjusting network 27 and with the polarity in that measuring network, the same as developed by thermocouple 24. Accordingly, if the range determining network 26 be now adjusted until the slidewire contact 21a shall exactly balance the 39 millivolts with the pen index 14 at the maximum scale position, it will be known that there will have been established the range of from 0 to 39 millivolts for subsequent operations.

The adjustment of the range determining network 26 is readily accomplished by operation of a knob 57 of a selector switch 57a to a position corresponding with the next value above that of the range desired. Since the desired range has been selected as 39 millivolts, the knob 57 will be rotated to the illustrated position corresponding with 50 millivolts and the selector switch 57a will be effective in its illustrated position through conductor 58 to short circuit or remove from the circuit the sections or resistor coils 59a–59d with the coil 59e remaining in the circuit now to be described.

The power supply circuit for the measuring slidewire 21 and the range or span adjusting network 26 may also comprise a regulated source of supply 60, which in this instance may be of the low cost variety, since the regulation requirements are less severe. If this voltage absolute output is maintained within plus or minus one-half of a percent, it will be satisfactory, but the stability of that voltage should remain within ±0.05% of that value. This source of supply 60 applies its voltage through a dropping resistor 61 to the range determining network 26 by way of a conductor 62, a contact 63a of a slidewire 63 and conductor 64 to the resistor section 59e. The circuit continues by way of the selector switch 57a and thence through resistors 64a–64e and by way of conductors 65 and 66 to the other side of the source of supply 60. It is in this manner, maximum voltage output from slidewire 21 is predetermined and fixed to correspond with 50 millivolts.

With the maximum value developed by slidewire 21 of 50 millivolts, the 39 millivolts inserted by a zero adjusting network 27 will be balanced when the contact 21a has traversed but 78 percent of its travel path. Thus, the motor 12 will bring the pen index 14 to a point opposite the value of 78 on scale 15.

In order now to reduce the output of slidewire 21 so that its maximum value will correspond with 39 millivolts, a knob 67 is rotated to move the slidewire contact 63a from its upper high limit in a counterclockwise direction towards its low limit. This slidewire 63 forms an Ayrton shunt, that is to say, it provides two current paths for the current supply to the network from source 60 by way of conductor 62. The first path will be by way of contact 63a through a part of slidewire 63 and thence to conductor 64. The other path will be from contact 63a through the lefthand portion of slidewire 63 and through a series resistor 70 to conductors 65 and 66 and thence to the other side of the source of supply 60. It is in this manner that the current flowing to slidewire 21 by way of the coarse adjusting switch 57a is reduced in value without change of the impedance of the circuit between conductors 64 and 65. That impedance, if changing at all, is of inconsequential magnitude and due solely to the inclusion of a calibrating resistor 72 in shunt with slidewire 63. This slidewire 63 provides a fine adjustment for the current shunt. In practice, the Ayrton shunt formed by slidewire 63 and contact 63a will normally provide a range of adjustment by knob 67 of about one-third of the output. Accordingly, the knob 67 is rotated until contact 63a reduces the output of slidewire 21 to a point where the pen index 14 is brought to standstill at its maximum scale position, 100 on scale 15. It is now known with the precision of the network as a whole, that the range or span of operation has been established at 39 millivolts.

Now that the span or range of the measuring system has been established, the knob 33 of the selector switch is rotated to return the contacts 33a and 33c to their illustrated positions for measurement of the temperature to which thermocouple 24 may be subjected. Of course, the zero adjusting network 27 for zero suppression will have contacts 45a and 45b returned to their illustrated position and the knob 52 rotated until its pointer and pointer 54 are again in registry with the zeroes on the respective scales. Thus, the network 27 will neither suppress nor elevate the zero. Thermocouples have known output characteristics and accordingly, with the range determined by the span adjusting network 26, values read on scale 15 or recorded on chart 16 will provide direct or readily convertible indications of temperature, temperatures ranging from 0° F. to 1300° F.

For the relatively wide span of measurement thus far described, some systems will require that the gain of the amplifier 11 be reduced. This can be conveniently accomplished by a gain control 11a of amplifier 11 and this in turn can be operated as by the mechanical connection shown by the broken line 73 from the knob 57, it being understood that greater sensitivity or greater gain will be utilized as the span of measurement is decreased.

Where it is desired closely to measure and closely to regulate temperature or other measured variable, the zero adjusting network 27 will be utilized. For example, if the temperature to which thermocouple 24 is subjected is to be closely maintained within the range of from 1200° F. to 1300° F., it will be desired to have the measuring instrument 10 provide full scale deflection with a change in the difference between the two temperatures of only 100°. Knowing that the thermocouple 24 will develop the previously assumed 39 millivolts at 1300° F. and from its characteristic curves knowing that it will develop 36 millivolts at 1200° F., it will be seen at once that the desired span will now be the difference of only 3 millivolts. The above described procedure is again utilized. The calibration span switch is operated by knob 33 to its Cal. Span position. The knob 52 is rotated until pointer 54 is moved opposite the position on its scale, corresponding with three millivolts, at which time it will be known that a voltage of 3 millivolts has been introduced in series with the measuring slidewire 21 and the input circuit of amplifier 11. Knob 57 of selector switch 57a is then rotated until the pointer is opposite the numeral 5. Since this is a value greater than the needed 3 millivolts, the knob 67 is again used to adjust slidewire contact 63a until the pen index 14 again occupies its uppermost position at the scale reading of 100.

Since the lower limit of the measuring range is now to be 36 millivolts, the knob 45 is rotated to position 30 on its scale and the knob 52 rotated until pointer 54 is opposite numeral 6. Thus, it is known that between conductors 34 and 35 there will be developed 36 millivolts. With the return of knob 33 to its illustrated position, the 36 millivolts will be connected in series with the thermocouple 24 in voltage opposing relationship, thus suppressing the zero or elevating the zero position of measuring slidewire contact 21a to a value of 1200° F. With rise in temperature of thermocouple 24 to any value between 1200° F. and 1300° F., the resultant unbalance signal applied to amplifier 11 will produce energization of motor 12 and movement of slidewire 21a to a corresponding balancing position with pen index 14 indicating on the scale and on the chart the exact temperature to which thermocouple 24 has responded.

For applications where the detector or condition responsive device develops a negative voltage, i.e., one with polarity reversed over that assumed for thermocouple 24, the following procedure is followed. The range is determined by the algebraic difference between the low end of the range and the high end of the desired range. Thus, if at the low end of the range the output should be −2 millivolts and the upper range 27 millivolts, the desired range will be 29 millivolts. After setting this range by the network 26 in the manner above described, the zero adjusting network 27 is then set for an output of 2 millivolts. For the measuring functions, knob 33 now operates the switches 33a–33c to their intermediate positions. In this manner, the 2 millivolts developed from network 27 is in series aiding relationship with the condition responsive device 24 and thus serves to elevate the zero by an amount corresponding with the negative value of the input at the low end of the range, i.e., the −2 millivolts.

It will be remembered that the drawing diagrammatically illustrates the invention and shows the measuring slidewire 21 at a location remote from the motor 12 and its associated amplifier 11. In practice, the measuring slidewire 21 will be located within the same housing containing the amplifier 11 and motor 12. However, the circuit features of the invention described above make it possible for the remaining components to be remotely located and hence decreases the space requirements of the instrument housing or panel so that a plurality of recorders of small size may be mounted closely together in a panel concurrently to present indications and to make records of a plurality of conditions under measurement. More particularly, the source of supply 60 and the two Ayrton shunts associated with measuring slidewire 21, together with its shunting resistors 28 and 29 may be remotely located, as near the thermocouple 24, or in other selected locations, together with the remote location of the network 27. For such applications the gain of amplifier 11 will be controlled by remotely located switching circuits for introducing gain-changing resistors in the circuit of the amplifier. These provisions optionally may be in addition to a continuously variable gain control such as indicated by the knob 11a in the drawing.

In summary, it will be seen that the system of the present invention provides adequate flexibility to meet a wide variety of measuring problems and that the range or span adjustments are continuously variable with any particular span precisely determined by utilizing the measuring network itself. In addition, the precision network for predetermining the range is also utilized for zero suppression and zero elevation over wide ranges. Thus, the precision network 27 with its regulated source of supply makes unnecessary the use of any standard cells and the like, since it provides the precision needed for calibration, as well as providing a precision source for establishing zero suppression or zero elevation, and a precision source for the establishment of any desired span for the measuring network 26.

Though a resistor 64f has been illustrated in the span determining network 26, such resistor will ordinarily be omitted for the reason that in the maximum or 100 millivolt position of switch 57a there will be a direct connection from conductor 64 through switch 57a and conductor 58 to the slidewire 21. Thus, the resistor 64f will not, in that position of the switch, serve a useful purpose. However, it has been shown to illustrate the fact that as a resistor section in the upper or first branch of the network is removed by movement of the switch 57a to the left, there is concurrently removed from the circuit a resistor in the associated lower or second branch. Thus, these two sections comprising resistors 59a–59e and 64a–64f form an Ayrton shunt as viewed from the branch of the circuit including the slidewire 63. Thus, the span adjusting network 26 can be looked at as comprising two Ayrton shunts in back-to-back relationship with maximum independency of the adjustments of either upon the other.

It is to be understood that modifications may be made, such as the utilization of a single-turn slidewire in place of the multiturn slidewire 44 and that different shunting networks may be provided and that certain features can be utilized in the absence of other features. Such variations are intended to be included within the scope of the appended claims.

What is claimed is:

1. In a measuring system having
   a voltage detector including an input circuit for application thereto of a voltage the magnitude of which is to be measured,
   a potentiometer having an adjustable measuring slidewire connected in said input circuit for developing therein a balancing voltage in opposition to said voltage to be measured and of magnitude variable by adjustment of said slidewire,
   voltage indicating means including a scale,
   means responsive to said voltage detector or adjusting said slidewire in a direction to change the magnitude of said balancing voltage in a direction to decrease the difference between said voltage to be measured and said balancing voltage, and
   an adjustable current shunt connected across said slidewire,
   said shunt comprising a coarse current-adjusting section adjustable by steps through a given range and a fine-adjusting section for modifying the current-adjusting range established by each of said steps, the combination of
   means for concurrently calibrating said voltage-indicating means and introducing into said input circuit in place of said voltage to be measured a voltage of magnitude equal to the algebraic difference between values selected for production respectively of operation of said indicating means to its lowest and highest values on said scale comprising
      a regulated constant voltage source, having a high degree of regulation for establishing a high degree of precision of the measurement by said indicating means,
      adjustable voltage-dividing means having a plurality of voltage-subdividing positions, and
      connections between said regulated constant-voltage source and said voltage-dividing means for predetermining the voltage value for each of said predetermined positions of said voltage-dividing means whereby for any selected position of said voltage-dividing means said coarse-adjusting section may be adjusted for the nearest range above said selected voltage and said fine-adjusting section of said current shunt may thereafter be adjusted to produce operation of said indicating means to its highest value on said scale,
   said voltage-adjusting means being thereafter set for introduction into said input circuit in series with the voltage to be measured of a voltage corresponding in sign and equal in magnitude to said voltage selected for operation of said indicating means to said lowest value on said scale.

2. The combination of claim 1 in which said adjustable voltage-dividing means is a potential divider of the Kelvin-Varley type comprising
   resistance means for subdividing the voltage of said regulated source into a plurality of fractional values,
   adjustable contracts for deriving from said resistance means said selected predetermined voltage value of said regulated voltage, and
   an adjustable multiple-turn slidewire connected across said contacts to form a continuously adjustable voltage divider for varying said fractional value of said voltage to bring it to a value equal to said selected predetermined voltage value, said fractional values varying one from the other by steps each equal to the voltage-dividing range of said multiple-turn slidewire.

3. The combination of claim 1 in which said coarse-adjusting section of said shunt comprises
   two sets of resistors each said set including a plurality of series-connected resistors, a first of said sets having one end thereof connected to one side of said measuring slidewire and the second of said sets having one end thereof connected to the opposite side of said measuring slidewire,
   switching means having stationary contacts respectively connected to said resistors of each of said sets and having movable contact means cooperating with said stationary contacts for concurrently removing in succession each resistor of said first set, while introducing in circuit with said contact means a resistor of said second set, and in which
   said fine-adjusting section comprises a slidewire with an associated contact and having one end of said slidewire connected to the same side of said measuring slidewire as said second set of the resistors and the opposite end thereof connected to the opposite end of said first set of resistors, said potentiometer including a source of voltage with one side thereof connected to the movable contact of said slidewire and the other side thereof connected to the side of said measuring slidewire to which said second set of resistors is connected.

4. In a measuring system having a voltage detector including an input circuit for application thereto of a voltage the magnitude of which is to be measured,
   a potentiometer having an adjustable measuring slidewire connected in said input circuit for developing therein a balancing voltage in opposition to said voltage to be measured and of magnitude variable by adjustment of said slidewire,
   voltage indicating means including a scale,
   means responsive to said voltage detector for adjusting said slidewire in a direction to change the magnitude of said balancing voltage in a direction to decrease the difference between said voltage to be measured and said balancing voltage,
   an adjustable current shunt connected across said slidewire,
   said shunt comprising a coarse current-adjusting section adjustable by steps through a given range and a fine-adjusting section for modifying the current-adjusting range established by each of said steps, the combination of
   means for concurrently calibrating said voltage detector and introducing into said input circuit in place of said voltage to be measured a voltage of magnitude equal to the algebraic difference between values selected for production respectively of outputs from said voltage detector corresponding with a selected low and a selected high value of said voltage to be measured comprising
      a regulated constant-voltage source having a high degree of regulation for establishing a high degree of precision of the measurement by said indicating means,
      adjustable voltage-dividing means having a plurality of voltage-subdividing positions, and
      connections between said regulated constant-voltage source and said voltage-dividing means for predetermining the voltage value for each of said predetermined positions of said voltage-dividing means whereby for any selected position of said voltage-dividing means said coarse-adjusting section may be adjusted for the nearest range above said selected voltage and said fine-adjusting section of said current shunt may thereafter be adjusted to produce operation of said voltage detector corresponding with said selected high value of said voltage to be measured, said voltage-adjusting means being thereafter set for introduction into said input circuit in series with the voltage to be measured of a voltage-corresponding in sign and equal in magnitude to said voltage selected for operation of said indicating means to said lowest value on said scale.

5. The combination of claim 4 in which said voltage-dividing means is of the Kelvin-Varley type comprising resistance means for subdividing the voltage of said regulated source into a plurality of fractional values, adjustable contacts for deriving from said resistance means said selected predetermined voltage value of said regulated voltage, and an adjustable multiple-turn slidewire connected across said contacts to form a continuously adjustable voltage divider for varying said fractional value of said voltage to bring it to a value equal to said selected predetermined voltage value, said fractional values varying one from the other by steps each equal to the voltage-dividing range of said multiple-turn slidewire.

References Cited by the Examiner
UNITED STATES PATENTS

| | | | |
|---|---|---|---|
| 2,459,081 | 1/1949 | Kunz | 324—131 |
| 2,656,498 | 10/1953 | Goodwin | 324—99 |
| 2,757,539 | 8/1956 | Broomell | 324—131 |
| 3,075,146 | 1/1963 | Wood | 324—99 |
| 3,087,115 | 4/1963 | Dawe | 324—100 |

WALTER L. CARLSON, *Primary Examiner.*

J. J. MULROONEY, *Assistant Examiner.*